United States Patent [19]

LaVelle

[11] 4,324,163
[45] Apr. 13, 1982

[54] CIRCULAR SAW CONSTRUCTION

[76] Inventor: Donald R. LaVelle, 2425 Whiteaker, Cottage Grove, Oreg. 97424

[21] Appl. No.: 150,640

[22] Filed: May 19, 1980

[51] Int. Cl.³ .............................................. B27B 33/12
[52] U.S. Cl. ....................................... 83/855; 83/835; 407/33
[58] Field of Search ................................. 83/835–855; 407/33, 47, 56, 61

[56] References Cited

U.S. PATENT DOCUMENTS

| 18,474 | 10/1857 | Tarrer. | |
|---|---|---|---|
| 110,430 | 12/1870 | Byrd. | |
| 245,831 | 8/1881 | Hubhard. | |
| 1,180,377 | 4/1916 | Conklin. | |
| 1,608,182 | 11/1926 | Posprech. | |
| 3,372,719 | 3/1968 | Shone. | |
| 3,700,016 | 10/1972 | Strobel | 83/848 |
| 3,730,038 | 5/1973 | Farb | 83/837 |
| 3,973,455 | 8/1976 | Slaats et al. | 83/851 X |
| 3,981,216 | 9/1976 | Lemmon | 83/848 |
| 4,011,783 | 3/1977 | Mobley | 83/846 |
| 4,034,638 | 7/1977 | Drum | 83/835 |
| 4,114,494 | 9/1978 | Budke et al. | 83/839 X |
| 4,135,421 | 1/1979 | Bertram et al. | 83/835 |
| 4,214,499 | 7/1980 | Ellis | 83/835 X |

Primary Examiner—Frank T. Yost
Assistant Examiner—Robert P. Olszewski
Attorney, Agent, or Firm—James D. Givnan, Jr.

[57] ABSTRACT

A circular saw blade for mounting on a powered saw arbor with the blade having saw shoulders spaced thereabout defining open gullet areas. Block shaped teeth of tungsten carbide, or the like, have a bevelled front face at one end of the tooth providing an accentuated rake angle for cutting efficiency. A tooth major axis is disposed substantially normal to a saw blade radius. The saw blade shoulder has an outer edge tangential to its circular path.

12 Claims, 5 Drawing Figures

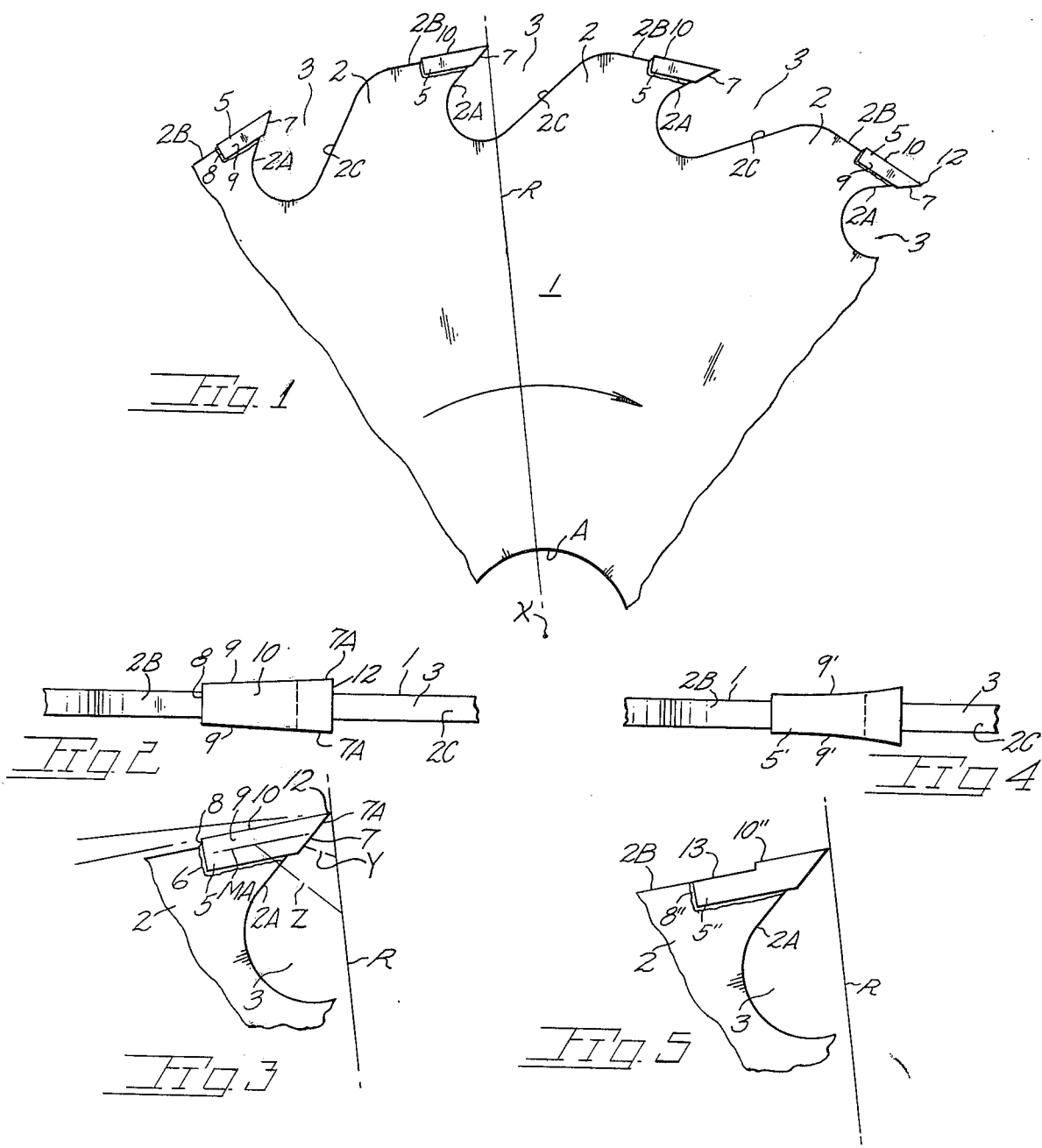

CIRCULAR SAW CONSTRUCTION

BACKGROUND OF THE INVENTION

The present invention pertains to circular power saws of the type having tungsten carbide teeth spaced thereabout.

Conventional saws of the present type as used in sawmills comprise a circular steel disk several inches in diameter having tungsten carbide teeth spaced about the saw perimeter with the major axis of each tooth in chordal relationship with the circular saw body. A frontal face of the tooth is parallel to said axis. In rip saws that cut with the grain of the wood the hook or rake angle of the teeth, i.e., the included angle defined by a blade radius and the tooth frontal face, is normally between twenty and thirty degrees. Increasing the tooth hook or rake angle while advantageous to saw blade efficiency reduces the mass of the saw shoulder, that area of the blade rearward of the tooth, to the extent that the shoulder is weakened and rendered susceptible to fatigue and fracturing.

U.S. Pat. No. 4,135,421 discloses a circular saw having elongate hardened tooth inserts wherein one end of the insert constitutes the front face in distinction to conventional saw tooth placement wherein an inclined lengthwise face of the tooth constitutes the frontal face. The saw blade of the above mentioned patent has closely spaced teeth suitable for a cut-off type saw with each tooth projecting forwardly over a dimpled outer blade area constituting a gullet. The gullets formed by webs of reduced thickness are intended to minimize noise resulting from conventional open saw blade gullets. The hook or rake angle of the tooth frontal face appears to be less than ten degrees angularity. Further, the tooth major axis is inclined at about 75 degrees to a blade radius intersecting the tooth outermost edge. Still further, no provision is made or advantages discussed for accentuating the tooth rake or hook angle.

While a desirable increase in rake angle is possible with an insert type tooth as seen in U.S. Pat. No. 3,372,719 such teeth are extremely costly to manufacture and maintain and for the most part are no longer widely used in sawmills partially for the reason the same cut a wide, and hence wasteful, kerf. U.S. Pat. No,. 3,730,038 is of interest for the reason a somewhat similar saw shoulder is disclosed.

SUMMARY OF THE PRESENT INVENTION

The present invention is embodied within a circular saw having saw teeth spaced about the blade periphery with each tooth having a forward end or face disposed at an accentuated rake angle to provide a relatively sharp cutting edge for optimum saw operation.

The present saw is particularly suited for use as a rip or edger saw and includes a circular blade having gullet openings spaced thereabout defining blade shoulders. A segment of the outer edge of each shoulder supports in an inset manner a saw tooth having its lengthwise axis disposed substantially normal to a saw blade radius. The forward end (relative the direction of blade rotation) of the tooth is bevelled to form a rake angle of approximately forty-five degrees for optimum cutting action and blade life. The saw shoulder supporting the tooth is of a size and configuration to preclude fracture under tooth imparted loads.

Important objects of the present saw include a saw with block shaped teeth spaced thereabout, said teeth being of extremely hard material and each having a major axis disposed substantially normal to a saw radius with tooth load vectors extending lengthwise along the tooth and with a tooth face rake angle range of forty to fifty degrees or so to said radius to provide a sharp cutting edge not heretofore found in blades with teeth having lesser rake angles; the provision of a saw blade having a lower arbor power requirement than conventional blades; the provision of a saw blade wherein the accentuated rake angle results in less tooth wear than conventional saw teeth; the provision of a saw blade wherein the blade is of reduced thickness for minimum kerf width yet a blade less susceptible to wander to provide a straight kerf and hence a blade particularly suited for use in over-and-under edger saw arrangements where saw kerfs desirably communicate with one another; the provision of a saw blade having teeth each with a front face forming an accentuated rake angle without reducing or weakening the supporting blade shoulder.

BRIEF DESCRIPTION OF THE DRAWING

In the drawing:

FIG. 1 is a fragmentary side elevational view on a slightly reduced scale of a saw blade incorporating the present invention;

FIG. 2 is a plan view of a saw blade segment;

FIG. 3 is a side elevational view of FIG. 2;

FIG. 4 is a view similar to FIG. 2 but showing a modified tooth; and

FIG. 5 is a view similar to FIG. 3 but showing still another modified tooth.

DETAILED DESCRIPTION OF THE PREFERRED EMBODIMENT

With continuing reference to the drawing wherein applied reference numerals indicate parts similarly hereinafter identified, the reference numeral 1 indicates a saw blade or disk of generally circular shape having a central aperture A enabling mounting of the blade, usually in a ganged manner, on a powered saw arbor for arrow indicated rotation about an axis X. As noted earlier, the present saw blade is particularly suited for use as a rip or edger saw.

Tooth supporting blade portions or shoulders at 2 are spaced about the blade's peripheral region and have a forward or leading edge 2A, an outer edge 2B and a rear or trailing edge 2C. The trailing edge 2C of one shoulder and the leading edge 2A of an adjacent shoulder define open gullet areas 3 within which the severed chip is received.

The outer edge 2B of each shoulder is normal to a blade radius and includes an inset, tooth receiving segment to which is secured a tooth 5 of tungsten carbide or the like brazed or silver soldered in place at 6. A front face of the tooth is at 7, a back face at 8, side faces as at 9 and an outer surface at 10. The tooth is of elongate, block shape with front face 7 bevelled to define along with an intersecting blade radius at R, a face angle at Y. The front face terminates in a square (to path of travel) transverse cutting edge 12. Angle Y is preferably forty-five degrees but with an acceptable range of plus or minus five degrees. Lateral face edges are at 7A.

The major or lengthwise axis of the tooth is indicated at MA. Said axis is substantially normal at Z to blade radius R.

The outer surface 10 of each tooth is inclined inwardly and rearwardly relative the saw blade and saw rotation in the magnitude of about 5 degrees to provide clearance aft of tooth cutting edge 12. Similarly, side faces 9, as viewed in FIG. 2, are inclined with respect to a vertical medial plane of the tooth to avoid undue frictional engagement with the kerf walls.

In the modified tooth 5' shown in FIG. 4, the side faces 9' are radiused on about two inch centers to provide kerf clearance.

In FIG. 5, I show a still further modified tooth 5" wherein a tooth outer surface at 10" is of irregular configuration for kerf clearance. A relieved segment at 13 extends forwardly from the tooth rear face 8" to approximately the mid-point of the tooth to enable tooth sharpening without diminishing tooth strength.

The present blade may be any diameter corresponding in size to conventional arbor mounted saws and similarly may bear approximately the same number of teeth. In one embodiment of the saw, the carbide tungsten tooth outer surface 10 has a length of one-half inch with transverse cutting edge 12 being only 0.180 thousandths of an inch to cut an economical kerf with tooth width decreasing at its back face to 0.150 thousandths of an inch. Saw blade thickness is somewhat less than the last dimension, for example 0.110 thousandths of an inch. The tooth front face 7 is desirably offset forwardly in the direction of rotation from the leading edge 2A of a subjacent shoulder to permit subsequent sharpening of the tooth without edge interference.

The outer edge 2B of each saw shoulder is substantially tangential to the circular path of said edge to provide a shoulder of requisite mass to support the tooth against load forces imparted along vectors generally orientated lengthwise of the tooth. From the foregoing, it will be seen that a tooth positioned in accordance with present saw blade construction clearly avoids destructive loads heretofore encountered by conventional "upright" disposed teeth (with face angles of about 30 degrees) which loads act about a saw shoulder fulcrum to subject the tooth brazing or solder (or the saw shoulder) to fracture.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A circular saw blade comprising,
 a saw blade having shoulder portions spaced about the saw perimeter defining open gullet areas therebetween, and
 saw teeth of block shape one each in place on one of said shoulder portions, said teeth each having a major axis substantially normal to an intersecting saw blade radius whereby load forces are imparted along vectors generally orientated lengthwise of each tooth, said teeth each having a beveled front face defining an included angle of between forty and fifty degrees with a tooth intersecting saw blade radius.

2. The saw blade claimed in claim 1 wherein said included angle is approximately forty-five degrees.

3. The blade claimed in claim 1 wherein said shoulder portions each have an outer edge substantially normal to a saw blade radius and terminating at one extremity at a back face of the tooth in place on said shoulder.

4. The blade claimed in claim 1 wherein said shoulder portions each have a leading edge partially defining a saw blade gullet, said leading edge in rearward offset relationship to the tooth front face.

5. The blade claimed in claim 1 wherein the front face of each tooth terminates outwardly in a transverse cutting edge disposed normal to the path of tooth travel.

6. The blade claimed in claim 1 wherein each of said teeth has inwardly curved side faces.

7. The blade claimed in claim 1 wherein each of said teeth has an irregular outer surface to provide kerf wall and chip clearance.

8. A circular saw blade comprising:
 a saw blade having shoulder portions spaced about the blade perimeter to define open gullet areas therebetween; and
 elongated saw teeth, each tooth having a bevelled front face forming a cutting edge and mounted on a shoulder of the blade to dispose the longitudinal axis thereof substantially normal to the blade radius passing through the cutting edge and to dispose the bevelled front face at an angle of between 40 and 50 degrees with the blade radius passing through the cutting edge, the substantially normal disposition of the tooth longitudinal axis causing the load forces to be along vectors generally orientated lengthwise of each tooth.

9. The saw blade according to claim 8 wherein the angle is approximately 45 degrees.

10. The saw blade according to claim 8 or 9, wherein the shoulder portions each have an outer edge disposed substantially normal to the blade radius passing through the center thereof and terminate at one extremity at the rear face of the mounted tooth.

11. The saw blade according to claim 10, wherein the shoulder portions each additionally have a leading edge which terminates at one extremity in rearward offset relationship to the front face of the tooth.

12. The saw blade according to claim 8, wherein each cutting edge is disposed normally to the plane of the saw blade.

* * * * *